US006480463B2

(12) United States Patent
Hunter et al.

(10) Patent No.: US 6,480,463 B2
(45) Date of Patent: **\*Nov. 12, 2002**

(54) METHOD AND DEVICE FOR WRITE PROTECTING COMPACT DISK MEDIA

(75) Inventors: Charles L. Hunter, Loveland, CO (US); Lawrence Taugher, Loveland, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/790,038

(22) Filed: Feb. 20, 2001

(65) Prior Publication Data

US 2001/0022776 A1 Sep. 20, 2001

Related U.S. Application Data

(62) Division of application No. 09/159,251, filed on Sep. 23, 1998, now Pat. No. 6,236,638.

(51) Int. Cl.[7] .................................................. G11B 3/70
(52) U.S. Cl. ....................................................... 369/290
(58) Field of Search ................................. 369/290, 283, 369/284, 289, 291, 292; 428/64.2, 64.3, 64.4, 64.6, 65.2, 65.6; 206/307, 308.1, 313

(56) References Cited

U.S. PATENT DOCUMENTS

| 5,922,430 A | * | 7/1999 | Biddlecome | 369/291 |
| 6,081,501 A | * | 6/2000 | Hunter et al. | 369/290 |
| 6,151,294 A | * | 11/2000 | Parlog et al. | 369/289 |
| 6,192,025 B1 | * | 2/2001 | Chen | 369/283 |
| 6,302,176 B1 | * | 10/2001 | Chen | 156/391 |

* cited by examiner

Primary Examiner—David Hudspeth
Assistant Examiner—Angel Castro

(57) ABSTRACT

A write-protect ring for protecting an optical disk from being written upon is disclosed. The write-protect ring includes an adhesive portion and a non-adhesive portion so that the non-adhesive portion is nearer data regions of the optical disk, thereby preventing the adhesive from interfering with the data on the optical disk. The write-protect ring may also include permanent adhesive which prevents the write-protect ring from being removed from the optical disk without damage to the optical disk.

17 Claims, 7 Drawing Sheets

METHOD AND DEVICE FOR WRITE PROTECTING COMPACT DISK MEDIA

This application is a division of application Ser. No. 09/159,251, filed Sep. 23, 1998, now U.S. Pat. No. 6,236,638.

FIELD OF INVENTION

This invention relates generally to optical disk media and more specifically to attachment of adhesive backed rings used for write protection on rewritable compact disk media and similar optical disk media.

BACKGROUND OF THE INVENTION

Rewritable mass memory media is typically contained in a rigid protective cartridge during operation and the cartridge typically includes a write-protect feature to protect information on a storage medium from being destroyed. For example, many data tape cartridges have a moveable plastic tab on the cartridge that can be moved to one of two positions. Similarly, flexible diskettes in hard plastic cases have a sliding or breakaway plastic tab on the plastic case. Rewritable compact disks (CD-RW) and rewritable Digital Versatile Disks (DVD, also called Digital Video Disks), however, are not in a cartridge during operation. Compact discs are commonly stored in clear plastic containers commonly called "jewel" cases or jewel boxes, but the disks are removed from these boxes during operation. Therefore, write protection for CD's and DVD's must be implemented directly on the disk medium. Solutions have been proposed that are software based. That is, if a particular bit or data field has a particular value, software (operating system or drive controller) is not supposed to overwrite data on the medium. However, software solutions require support by all operating systems, software drivers and drives. If a disk is created by one operating system or drive controller that supports a software write-protect feature, and then is taken to a system that does not support the feature, data may be inadvertently destroyed. In addition, a software virus could bypass software write protection to delete data on the disk. There is a need for a physical write-protect feature, directly on the disk medium, that protects against writing for any software or any drive.

Industry standard CD-RW media use a phase change material having a transparency that can be reversibly changed by heating, and then cooling at a controlled rate. In CD-RW drives, a laser is used to heat, and then cool small areas at a controlled rate. Laser power must be calibrated for each disk medium. Before writing or erasing, a standard CD-RW drive must successfully calibrate laser power by writing into a Power Calibration Area on the medium. If the drive cannot read the calibration patterns in the Power Calibration Area, it will not erase or write in the data area of the disk. U.S. application Ser. No. 08/823,823, hereby incorporated by reference, discloses a write-protect device in which the Power Calibration Area is covered by a removable opaque adhesive backed ring. Optical disks of interest have a central hole. Drives grip the optical disk around the central hole using mechanisms that may be sensitive to the thickness of the optical disk. Therefore, the write protect ring preferably does not intrude in the area of the disk immediately surrounding the central hole in the disk. The permissible mechanical tolerance for positioning a write-protect ring is relatively small. However, if a write-protect ring cannot intrude into the area adjacent to the central hole in the disk, the central hole in the disk cannot be used to directly align a write-protect ring. There is a need for a low cost, easy-to-use system for precise positioning of adhesive backed write-protect rings onto optical disks. U.S. application Ser. No. 08/932,849, filed Sep. 18, 1997, hereby incorporated by reference, offers one such system. The present application offers another such system.

SUMMARY OF THE INVENTION

A write-protect ring is formed from a multilayer material. The material comprises an adhesive backed label layer and a backing layer. When installed on an optical disk, the write protect ring covers the area necessary to prevent writing to the disk. In operation, the backing layer is removed from the write-protect ring, exposing the adhesive, and the write-protect ring is pressed against the data side of the disk. The write-protect ring is left attached to the disk.

The first example embodiment of the invention provides a device that positions the write-protect ring so that it is aligned with the center hole of the disk. Aligning the write-protect ring with the center of the disk ensures that the ring is in the correct location, thereby enabling the write protect function. The device includes a hub upon which the center hole of the disk is pressed, thereby securing the disk to the device. The device also includes a support that surrounds the hub and is connected to the hub so that it may move axially along the hub. This support serves as a shelf for the write-protect ring and a press to assure good contact between the disk and the adhesive of the write-protect ring.

In operation the write-protect ring is positioned on the support with the adhesive exposed and facing upwards away from the support. The disk is then placed on the hub with its data side down. As the hole of the disk is pressed down upon the hub, the support of the device presses the write-protect ring against the disk, causing the write-protect ring to adhere to the disk. The disk is then removed from the device and it is now write-protected by the write-protect ring that is adhered to its data side.

The write-protect ring may also include a removable ring shaped alignment area. The alignment area is surrounded by the write-protect ring and forms a hole in its center that has the same diameter as the central hole of the disk. The alignment area helps the device of the present invention ensure that the write-protect ring is aligned to the center of the hole in the disk. After the disk with the write-protect ring attached is removed from the device, the alignment area is removed, leaving just the write-protect ring attached to the disk.

Multiple write-protect rings may be provided as tear-away features in an insert for the cover of the jewel case. Write-protect rings may be removable. Alternatively, if desired, permanent write-protect rings may be implemented by using a material with an adhesive that is extremely difficult to remove without damaging the disk.

DETAILED DESCRIPTION OF THE PREFERRED EMBODIMENT OF THE INVENTION

The invention relates to an apparatus and method for write-protecting an optical disk. More specifically, it is a device for correctly positioning a write-protect ring on an optical disk. The invention generally comprises a hub, that is designed to fit within the center hole of the optical disk, and a support surrounding the cylinder, upon which the write-protect ring rests prior to being installed on the optical disk.

Figure 1:
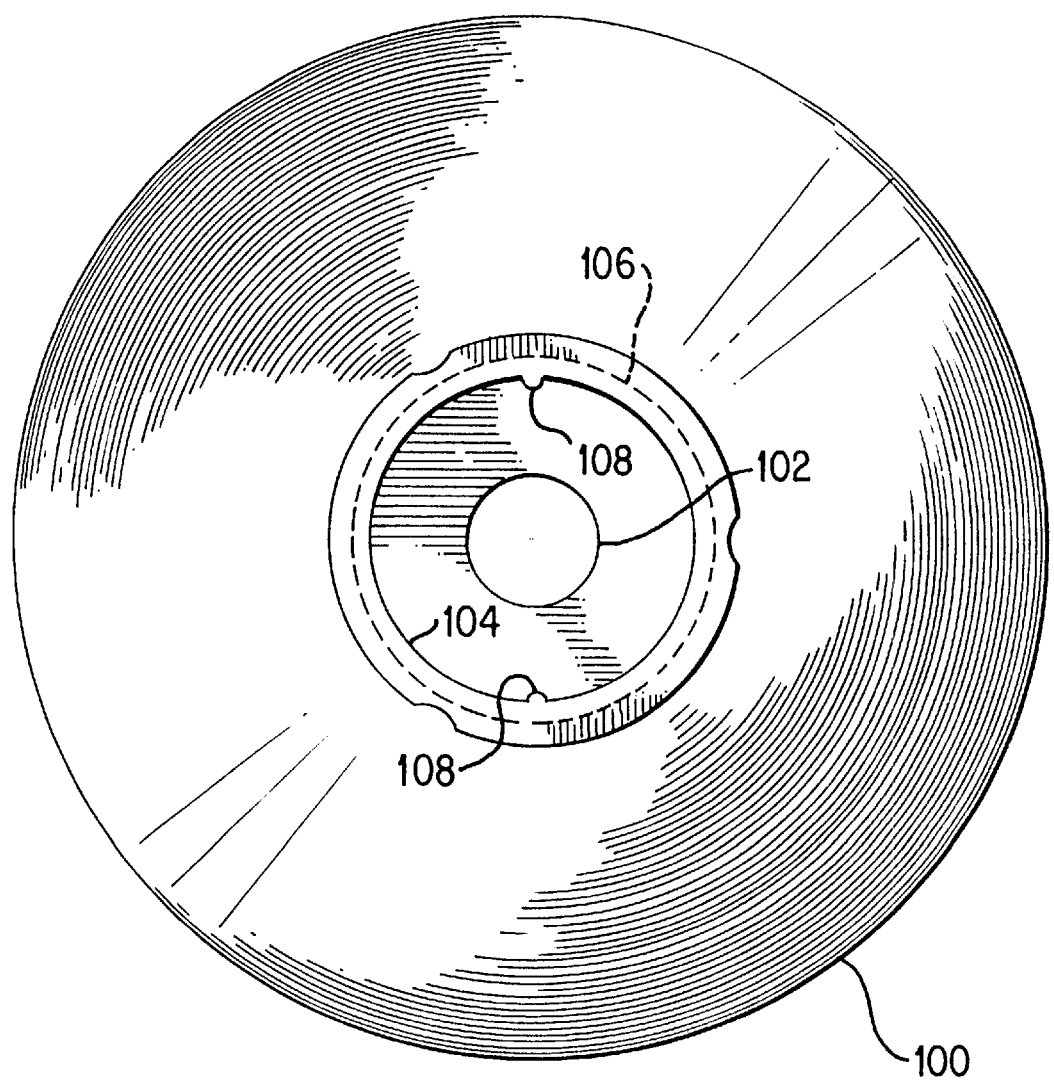
FIG. 1 is a plane view of the data side of a rewritable optical disk with an attached write-protect ring in accordance with the invention.

A standard rewritable optical disk 100 has a 120 mm diameter and a 15 mm diameter hole 102, as shown in FIG. 1. A circle having a diameter of 50 mm defines the beginning of the data area. Data is written along a single spiral track, starting at the inner edge of the data area and spiraling outward toward the edge of the disk. In rewritable media, a Power Calibration Area, having an inner diameter of 44.7 mm and an outer diameter of 45.5 mm, is used for laser power calibration. The drive laser system writes, and then reads, various test patterns in the Power Calibration Area to calibrate the peak power and rate of decrease of power. Laser writing power must be calibrated for each disk. In addition, there is a Program Memory Area, having an inner diameter of 45.5 mm and an outer diameter of 45.7 min. The Program Memory Area is used for a table of contents used only during writing.

Figure 2A:
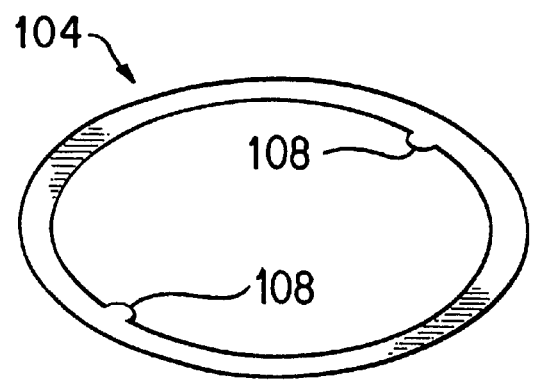
FIGS. 2a–2c are perspective, plane, and side views of the write-protect ring.
Figures 2B, 2C:
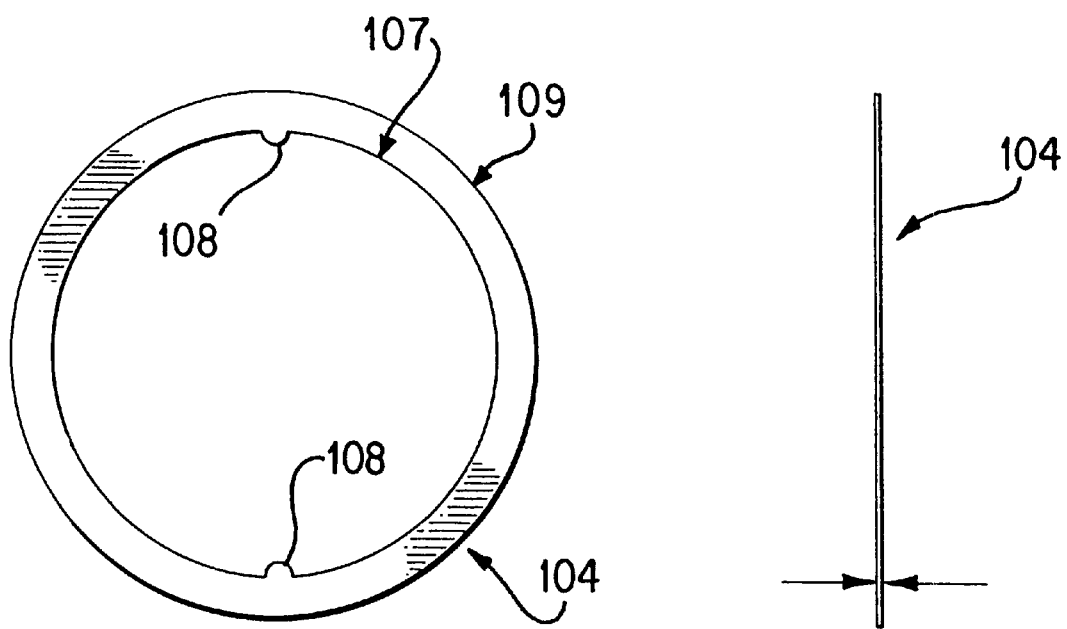

The write-protect ring 104 is a is multi-layered ring of opaque material, as shown in FIGS. 2a–2c. The layers of the write-protect ring 104 include an adhesive-backed label layer and a backing layer (not shown). The backing layer covers the adhesive prior to installation of the write-protect ring 104. The write-protect ring 104 works by covering the Power Calibration Area and preventing laser power calibration. Therefore, the inner diameter 107 and outer diameter 109 of the write-protect ring 104 should correspond to the inner and outer diameters of the Power Calibration Area.

Accordingly, as shown in FIG. 1, the outer radius of the write-protect ring 104 extends to the outer radius of the Power Calibration Area to prevent laser power calibration and the outer radius may cover part or all of the Program Memory Area. However, the outer radius of the write-protect ring 104 should not cover any of the data area. That is, for the CD-RW disk format dimensions discussed above, the write-protect ring 104 has a maximum inner diameter of 44.7 mm, a minimum outer diameter greater than 45.5 mm and a maximum outer diameter less than 50 mm (preferably less than 46 mm). Note that the laser (not illustrated) operates at a particular wavelength, so that "opaque" means that the write-protect ring 104 is sufficiently non-transparent at the wavelength of the laser to prevent a successful laser power calibration.

The adhesive on the label layer is preferably positioned so that it does not come into contact with data areas on the disk. Accordingly, the adhesive covers only on a portion of the write-protect ring 104 radiating outward from the inner diameter of the write-protect ring 104. As shown in FIG. 1, the adhesive extends only to the dashed line 106. This prevents the adhesive from leaving residue that could interfere with the capability to read and write data on the disk.

The write-protect ring 104 may be removable. As shown in FIGS. 2a–2c, the write-protect disk includes tabs 108 on its inner diameter. These tabs 108 may be pulled to remove the write-protect ring 104 from the disk.

Likewise, the adhesive may be a permanent adhesive that prevents the write-protect ring 104 from being removed without damaging the disk and the write-protect ring 104. The adhesive would cover the entire write-protect ring 104 and would be adhered to the data area of the disk. Embodiments of the write-protect ring 104 also include "tamper apparent" indications which would create visually obvious signs that an attempt had been made to remove the write-protect ring 104.

Figure 3:
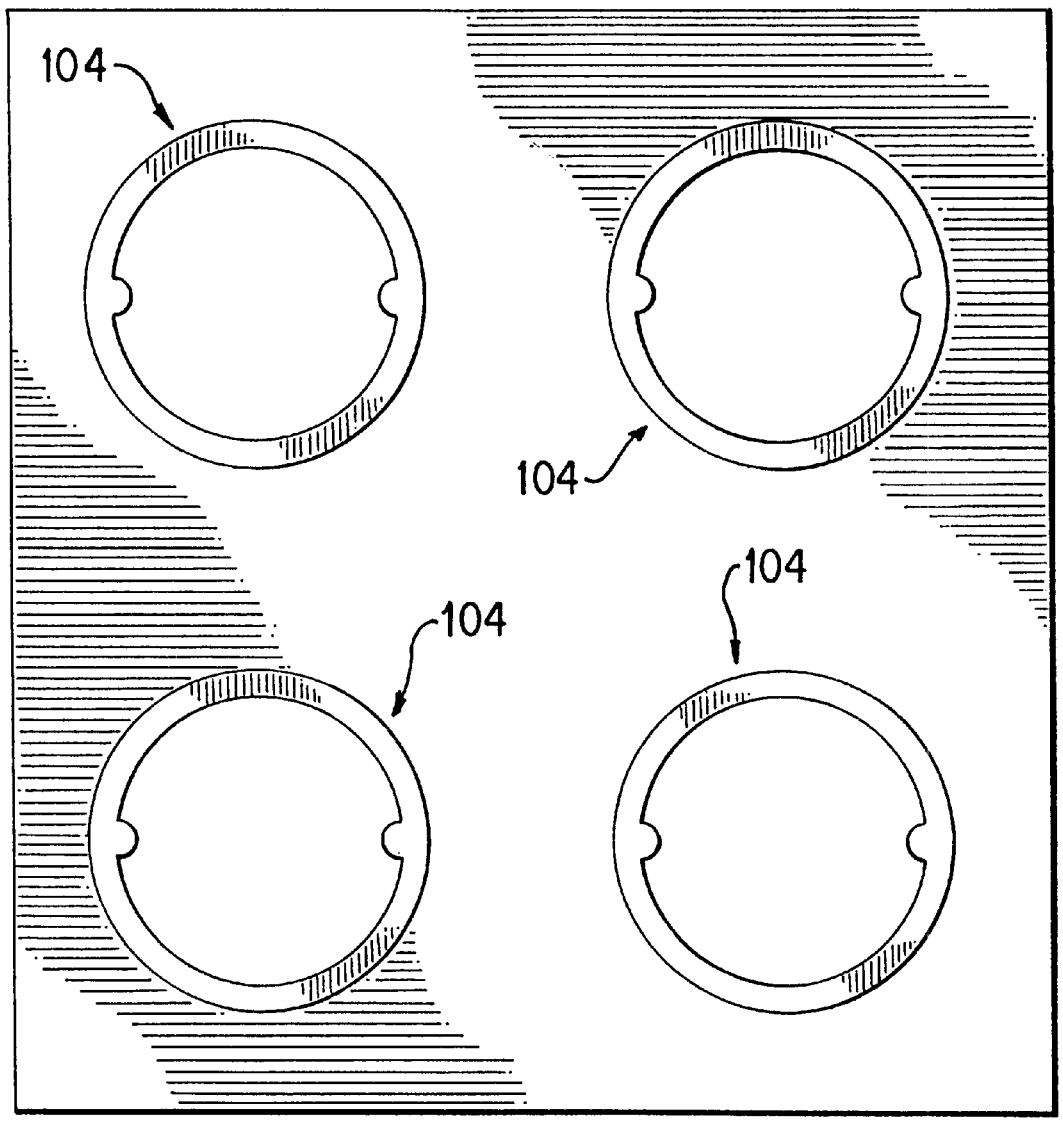
FIG. 3 is a plane view of four write-protect assemblies formed onto a sheet of material suitable for inserting into the lid of a jewel case for optical disks.
Figure 4A:
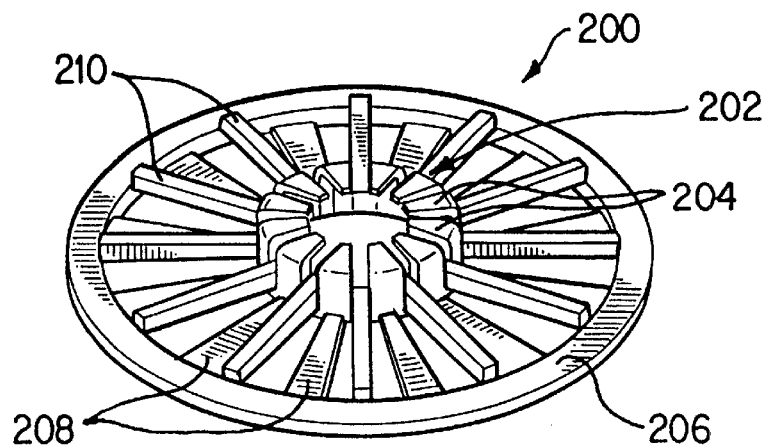
FIGS. 4a–4f are top perspective, bottom perspective, side, plane, and additional side views of an embodiment of the write-protect ring installing device.
Figure 4B:
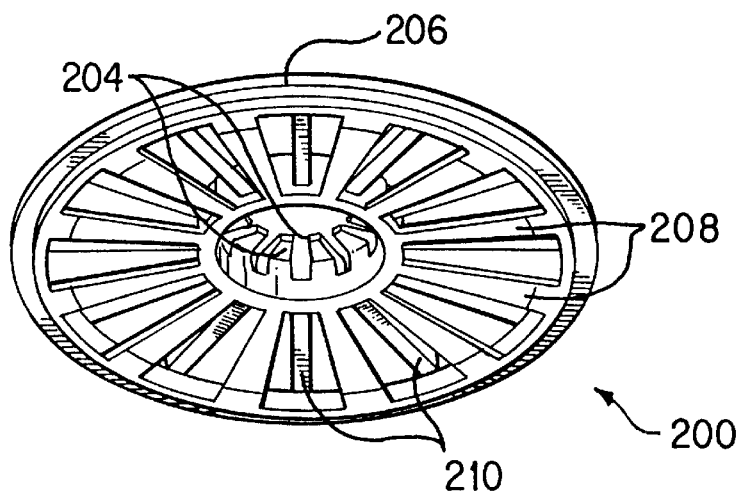
Figure 4C:
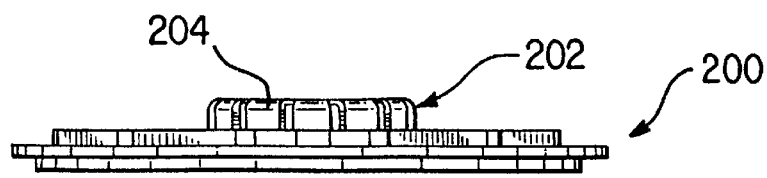
Figures 4D, 4E:
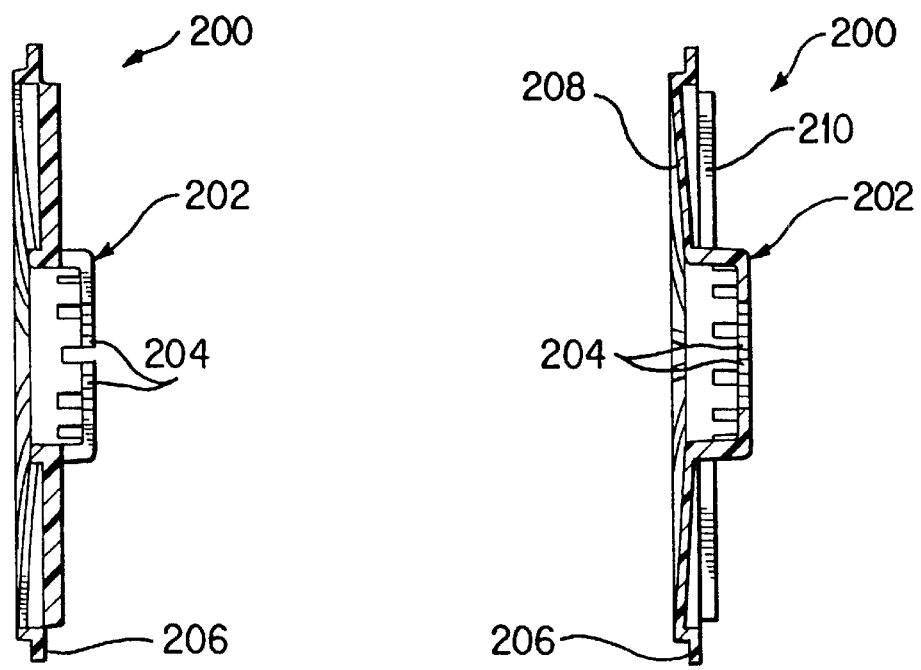
Figure 4F:
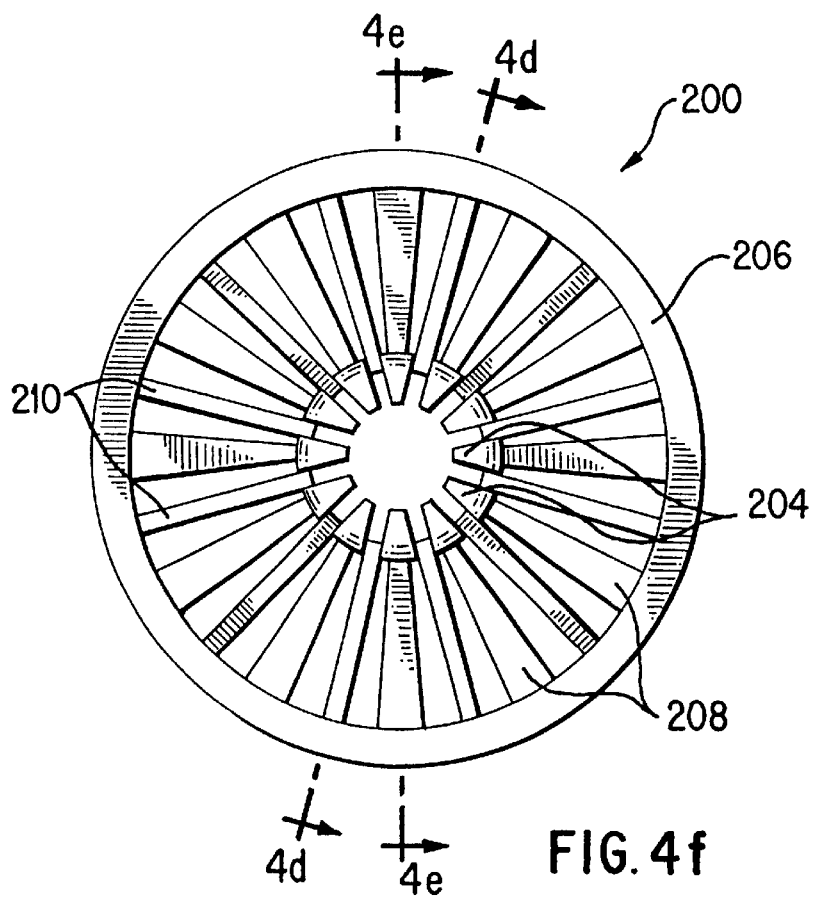

The write-protect ring 104 may be offered on a sheet of multiple rings. FIG. 3 illustrates a sheet 200 of two-layer material with four write-protect rings cut into the layers of the sheet. The sheet illustrated in FIG. 3 has an overall size suitable for inserting into a lid of a CD jewel case, just as title inserts and other materials are commonly placed in the lid.

The device 200 of the present invention generally includes a hub and a support. The hub is centrally located in the device 200 and is sized to fit within the center hole of the disk. The hub centers the device 200 on the disk, thereby helping to properly position the write-protect ring 104 on the disk. The hub also holds the disk, keeping it generally stationary while the write-protect ring 104 is installed. The hub may be a variety of shapes, including cylinders, rings, cones, cubes, etc.

In the preferred embodiment, as shown in FIGS. 4a–4f, the hub is a cylinder 202 that has fingers 204 that flex when the center hole 102 of the disk 100 is pressed upon the cylinder 202. This flexing causes the cylinder 202 to snugly fit within the hole 102 of the disk 100, thereby limiting the disk's movement when the write-protect ring 104 is installed. When the disk 100 is removed from the device 200, the fingers 204 un-flex and resume their normal form.

The support is connected to the hub and is centered around the hub. The support helps to position the write-protect ring 104 prior to its installation on the disk 100. The support also helps to press the write-protect ring 104 against the disk 100, thereby assuring good contact between the disk 100 surface and the adhesive. The support may also allow the device 200 to sit on a flat surface while in use or at rest. The support may be a variety of shapes, including rings, squares, triangles, partial rings, partial squares, partial triangles, etc.

Referring to FIGS. 4a–4f, the support in the preferred embodiment is an outer ring 206 that is approximately the same size as the write-protect ring 104. In this embodiment, the outer ring 206 is connected to the cylinder 202 with connecting ribs 208 which allow the outer ring 206 to move axially along the cylinder 202. These connecting ribs 208 also position the outer ring 206 so that it is centered around the cylinder 202, and therefore, help ensure that the write-protect ring 104 is evenly and properly positioned on the disk 100.

The device 200 may also have additional features which assist in the proper positioning of the write-protect ring 104. One such feature is aligning ribs 210 that radiate outwards from the cylinder 202. As seen in FIGS. 4a–4f, the aligning ribs 210 in this embodiment define the inside diameter of the write-protect ring 104. When the write-protect ring 104 is placed on the outer ring 206, the aligning ribs 210 help ensure that the ring is centered on the device 200 and thereby properly positioned for installation on the disk 100.

In operation, the write-protect ring 104 is placed on the outer ring 206 and around the aligning ribs 210. The backing layer is removed from the write-protect ring 104, exposing the adhesive. A disk 100, with its data side facing the device 200, is placed on the device 200 so that the cylinder 202 enters the center hole 102 of the disk 100. The disk 100 is pressed firmly onto the device 200 so that the outer ring 206 applies pressure on the write-protect ring 104 towards the disk 100. The adhesive is thereby pressed against the surface of the disk 100 and causes the write-protect ring 104 to adhere to the disk 100. The disk 100 is then removed from the device 200, leaving the write-protect ring 104 attached, as shown in FIG. 2.

Figure 5:
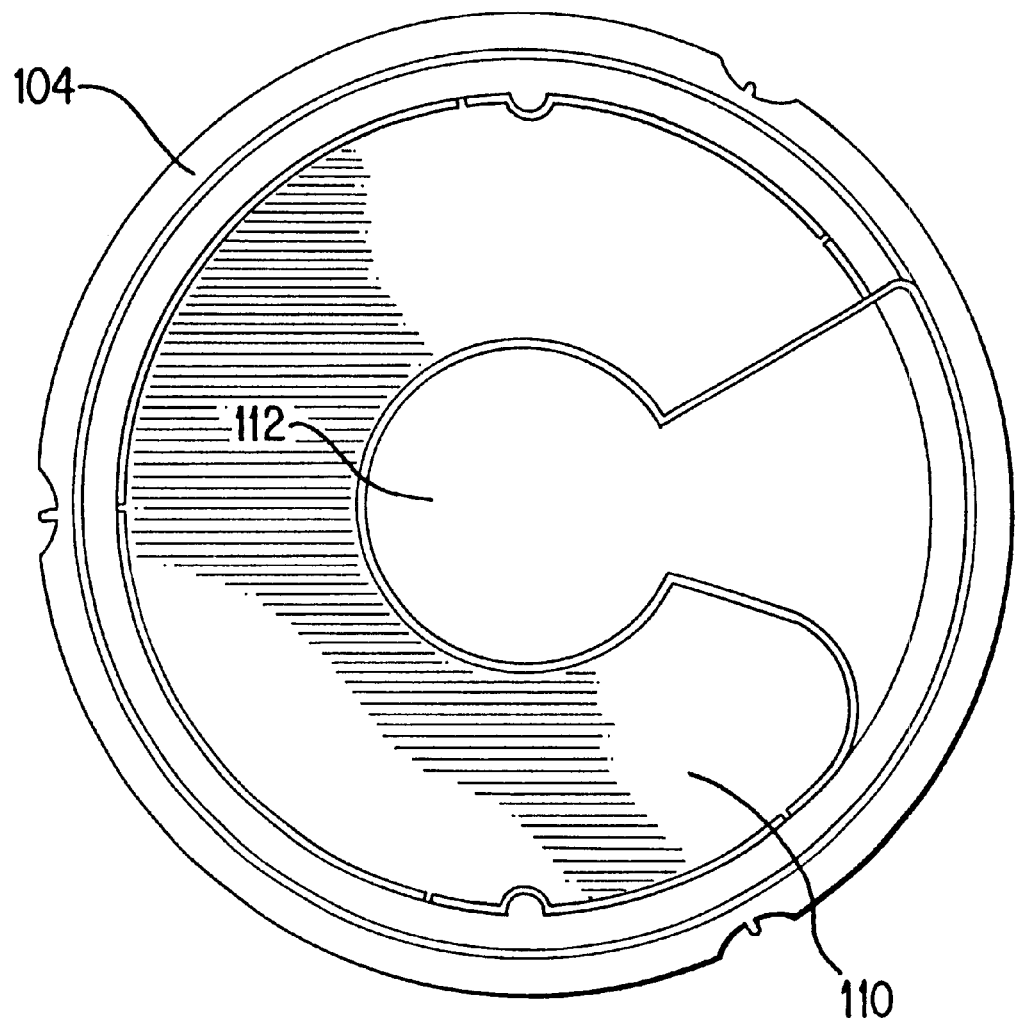
FIG. 5 is a plane view of another write-protect ring used with the write-protect ring installing device.

There are additional features which assist the device 200 to properly position the write-protect ring 104. As seen in FIG. 5, the write-protect ring 104 has an alignment ring 110 which is located within the inner diameter of the write-protect ring 104. The alignment ring 110 has a hole 112 in its center that is the same diameter as the hole 102 in the disk 100. When the write-protect ring 104 is placed on the device 200, the hole 112 in the alignment ring 110 fits snugly around the hub. Accordingly, the alignment ring 110 centers the write-protect ring 104 on the device 200, helping to ensure that it is installed at the correct location on the disk 100. The alignment ring 110, therefore, has the same purpose as the aligning ribs 210 described above. As such, a write-protect ring 104 with an alignment ring 110 may be used on a device 200 with or without aligning ribs 210.

Figure 6:
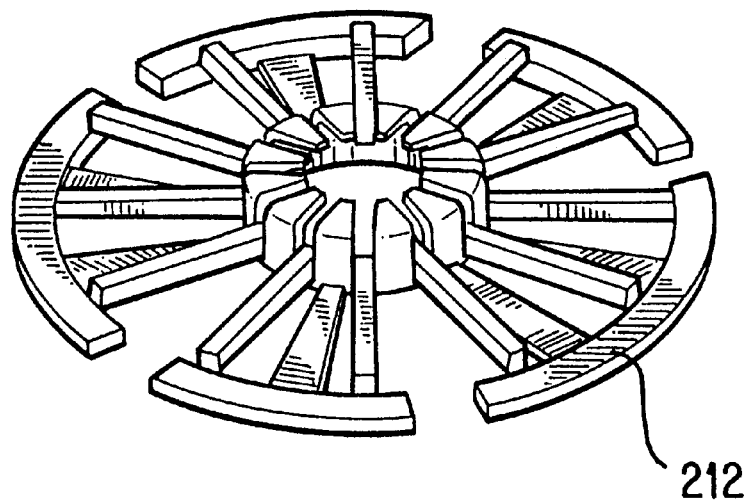
FIG. 6 is a perspective view of another embodiment of the write-protect ring installing device.

As described above, the support may be a variety of shapes. In the alternative embodiment shown in FIG. 6, the support is a partial ring 212, with gaps around its circumference. The partial ring 212 has an inner diameter and outer diameter approximately equal to the inner diameter and outer diameter of the write-protect ring 104. The partial ring 212 functions in a manner similar to the outer ring 206 described above. The write-protect ring 104 is placed on the partial ring 212 and the disk 100 is pressed down on the device 200, causing the partial ring 212 to press the write-protect ring 104 against the disk 100.

Figure 7:
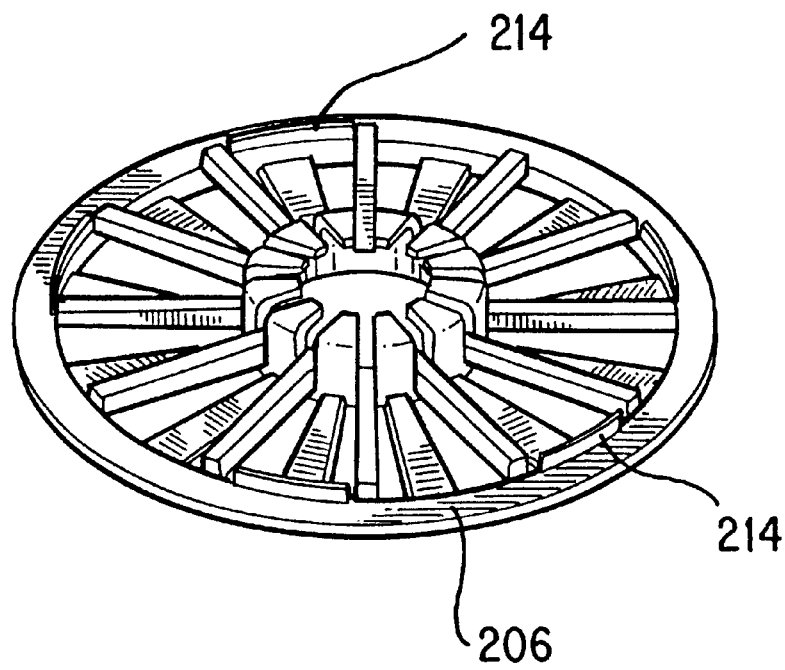
FIG. 7 is a perspective view of another embodiment of the write-protect ring installing device.

Another alternative embodiment of the device 200 includes ridges 214 on the support. In FIG. 7, the ridges 214 are at various locations around the outer ring 206 described above. These ridges 214 perform a similar function to the aligning ribs 210 in that they define the inner diameter around which the write-protect ring 104 is placed. Accordingly, the ridges 214 help to keep the write-protect ring 104 centered on the device 200 so that it is properly positioned on the disk 100.

The foregoing description of the present invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. An apparatus for write protection of an optical disk, the optical disk having a power calibration area and a data area, comprising:
    a write-protect ring, that covers a power-calibration area of an optical disk when installed on the optical disk, wherein the write-protect ring has a first side with an adhesive portion and a non-adhesive portion, the first side of the write-protect ring contacting the optical disk when the write-protect ring is installed on the optical disk.

2. The apparatus of claim 1, wherein the non-adhesive portion is nearer to an outer diameter of the write-protect ring and a data area of the optical disk when the write-protect ring covers the power calibration area of the optical disk.

3. The apparatus of claim 1, wherein the adhesive portion covers the power calibration area of the optical disk.

4. The apparatus of claim 1, wherein the write-protect ring further comprises:
    a means for visually indicating an attempt to remove the write-protect ring.

5. The apparatus of claim 1, wherein the write-protect ring further comprises:
    one or more tabs on an inner diameter of the write-protect ring, wherein the a tab is pulled to remove the write-protect ring from the optical disk.

6. The apparatus of claim 1, further comprising:
    an alignment ring located within an inner diameter of the write-protect ring.

7. A method of write protection for a optical disk, the optical disk having a power calibration area and a data area, the method comprising:
    covering the power calibration area with a write-protect ring by adhering a portion of the write-protect ring to the optical disk.

8. The method of claim 7, wherein the adhered portion of the write-protect ring is adhered to an area of the optical disk not adjacent to the data area of the optical disk.

9. The method of claim 7, wherein the write-protect ring includes an alignment ring that has an inner diameter that is the same as an inner diameter of the optical disk, the method further comprising:
    aligning the write-protect ring on the power calibration area using the alignment ring, wherein the alignment ring inner diameter is aligned with the inner diameter of the optical disk.

10. An apparatus for write protection of an optical disk, the optical disk having a power calibration area and a data area, comprising:
    a write-protect ring, that covers a power-calibration area of an optical disk when installed on the optical disk, including an adhesive that allows the write-protect ring to be permanently be attached to the optical disk.

11. The apparatus of claim 10, further comprising:
    a means for visually indicating attempts to remove the write-protect rings.

12. The apparatus of claim 10, wherein removing the write-protect ring from an optical disk after the write-protect ring has been installed on the optical disk damages the optical disk.

13. The apparatus of claim 10, wherein the write-protect ring has a first side with an adhesive portion and a non-adhesive portion, the first side of the write-protect ring contacting the optical disk when the write-protect ring is installed on the optical disk.

14. The apparatus of claim 13, wherein the non-adhesive portion is nearer to an outer diameter of the write-protect ring and a data area of the optical disk when the write-protect ring covers the power calibration area of the optical disk.

15. The apparatus of claim 13, wherein the adhesive portion covers the power calibration area of the optical disk.

16. The apparatus of claim 10, wherein the write-protect ring further comprises:
one or more tabs on an inner diameter of the write-protect ring, wherein the a tab is pulled to remove the write-protect ring from the optical disk.

17. The apparatus of claim 10, further comprising:
an alignment ring located within an inner diameter of the write-protect ring.

* * * * *